May 12, 1964 N. L. PETERSON ETAL 3,133,233
CONTROL SYSTEM FOR MATERIAL HANDLING
Filed Nov. 4, 1960 3 Sheets-Sheet 1
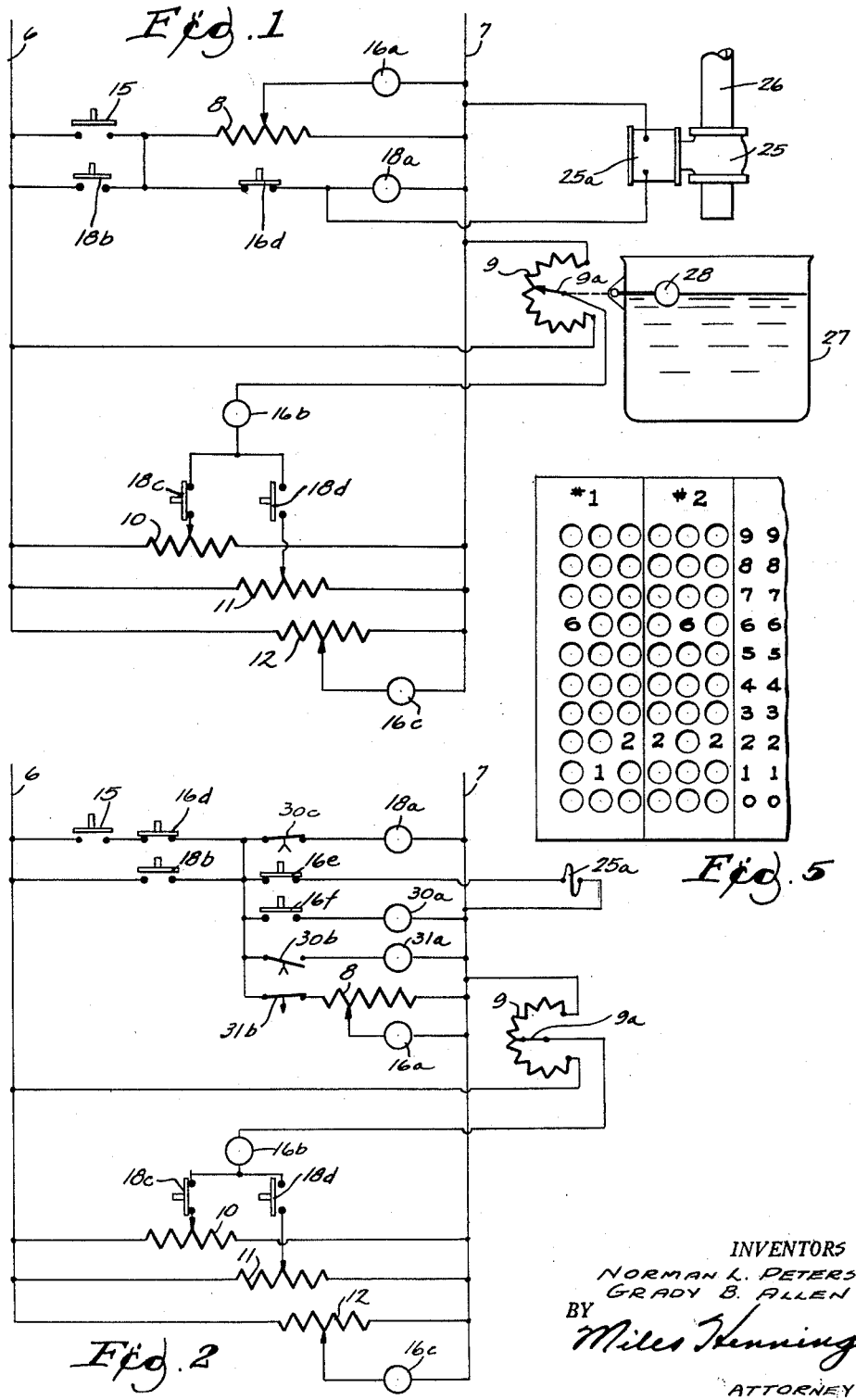
INVENTORS
NORMAN L. PETERSON
GRADY B. ALLEN
BY
Miles Henninger
ATTORNEY May 12, 1964 — N. L. PETERSON ETAL — 3,133,233
CONTROL SYSTEM FOR MATERIAL HANDLING
Filed Nov. 4, 1960 — 3 Sheets-Sheet 2

INVENTORS
NORMAN L. PETERSON
GRADY B. ALLEN
BY Miles Henninger
ATTORNEY

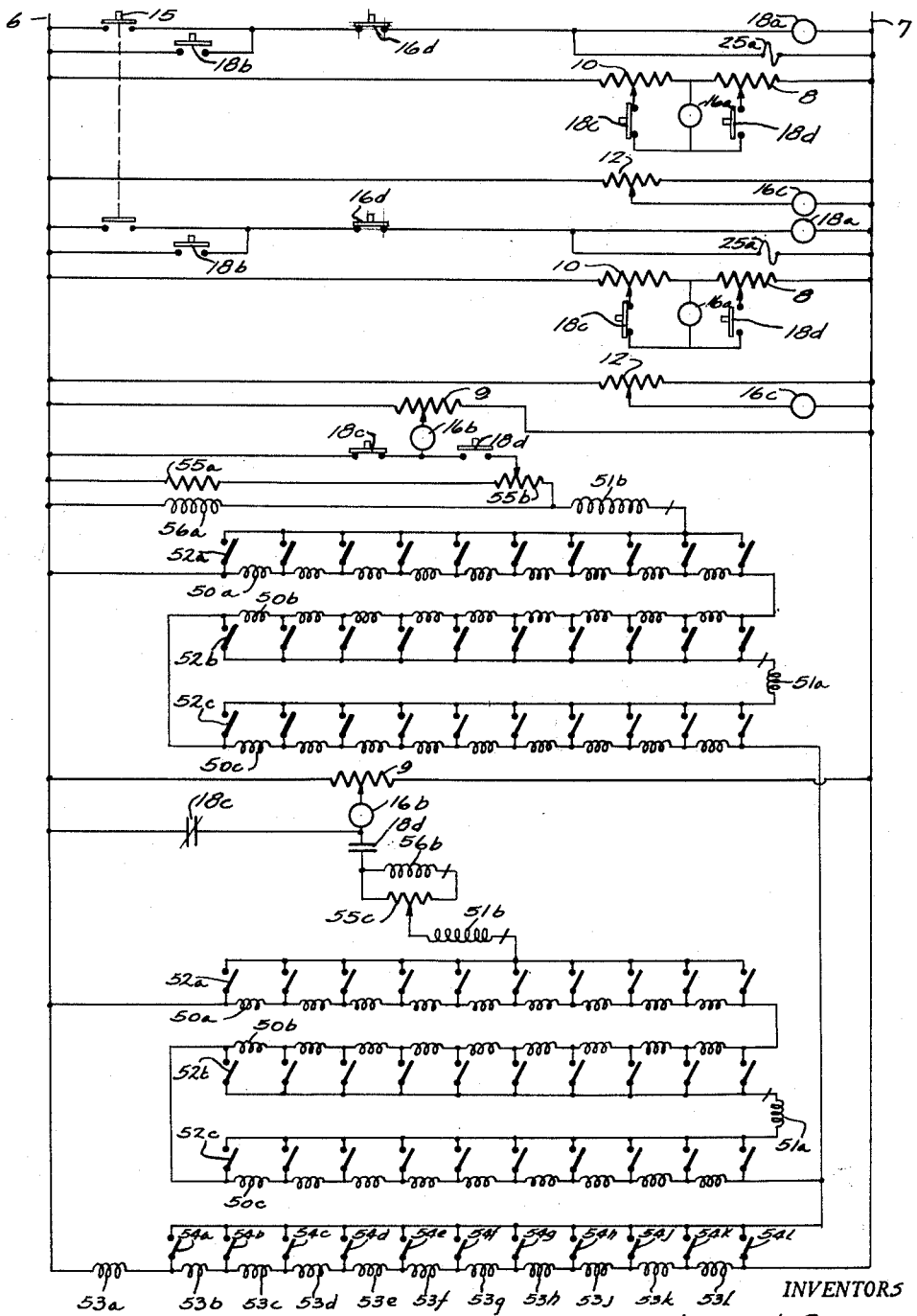

United States Patent Office 3,133,233
Patented May 12, 1964

3,133,233
CONTROL SYSTEM FOR MATERIAL HANDLING
Norman L. Peterson, Wauwatosa, and Grady B. Allen, Milwaukee, Wis., assignors to Allen Electric Co., Inc., Milwaukee, Wis., a corporation of Wisconsin
Filed Nov. 4, 1960, Ser. No. 67,314
23 Claims. (Cl. 317—153)

This invention relates to an automatic system for metered control of a material or a group of materials or of a mechanical condition or property of such materials which can be measured.

In systems where a material or materials are to be metered, the quantity of material received is the product of the time and the rate at which the material is received. If the amount of material received, its weight, depth or other measurable condition or property can be transduced to an electrical signal, preferably a voltage ratio, the system can be electrically controlled. When mechanical values such as indicated above are to be transduced to electrical signals, it is convenient to translate the mechanical value into a change in position and then into an electric signal in an electrical device such as a potentiometer, a differential transformer or the like.

In the use of a potentiometer as a transducer, a voltage impressed across the potentiometer is divided into two values dependent on the position of the movable contact and on the ratio of resistance from the movable contact to the two voltage source lines. When the position of the movable potentiometer contact is to be transduced into a voltage ratio it is desirable to have the minimum voltage ratio represent the zero of the transduced mechanical value. However it is difficult to maintain a minimum or zero voltage ratio because the zero position of a potentiometer contact is not usually at the physical endpoint of the resistor. The present application discloses means whereby the difficulty of obtaining a minimum or zero voltage ratio does not limit or otherwise affect operation of the system.

The basic control system of the present invention is readily amended by addition of two relays which give an "off-on" modulation just prior to the time at which the circuit is to operate to control a material or materials. Such cycling is continued until the vector sum of the ampturns of certain of the relays windings exceeds zero and the re-cycling automatically stops. The basic control system can also be extended to provide metering of values in terms of units, tens and hundreds and of a plurality of conditions or properties or materials. The various portions of the systems are easily interconnected and a selector switch is used to determine the amount of each value which is permitted to pass through the system.

In the drawings:

FIG. 1 illustrates the basic control system by which a mechanical value (position) is transduced into a voltage ratio and such voltage ratio is employed to control the amount of a material passing through a valve;

FIG. 2 illustrates the system of FIG. 1 with the addition of two timing relays and two additional contacts for a previously used relay, by which an "off-on" modulation of the control circuit may be obtained to secure more accurate operation of the means for controlling the mechanical value of the material being handled;

FIG. 4 illustrates a control system in which two materials are controlled and in units, tens or hundreds as desired, a selector switch coacting with a card in determining the amount of each value passing through the system, control of more materials merely requiring duplication of system parts.

Figure 3:
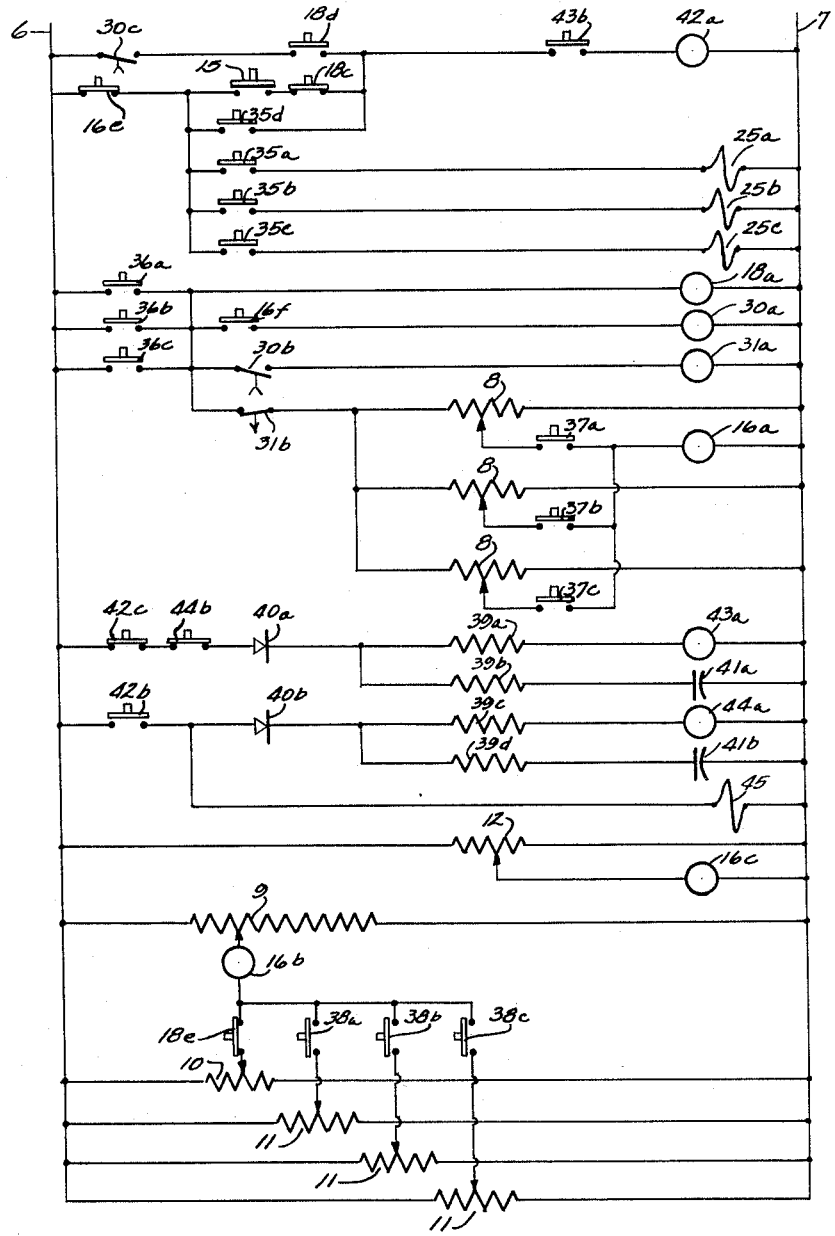
FIG. 3 illustrates a modification of FIG. 2, in which a step switch is used in combination with other parts to secure control of a number of conditions in a particular sequence.

And FIG. 5 is a plan view of a fragment of a card for operating the switches of the system shown in FIG. 4.

In FIG. 1, a number of potentiometers are used to transduce a mechanical value namely a change in level within a container, into an electrical signal and, in combination with a number of relays operate a contact or contacts, the circuit controlling electrical means for controlling the amount of the material passing through the system and thereby controlling the level of material. Referring particularly to FIG. 1, voltage source lines 6, 7 are connected by a number of potentiometers designated 8, 9, 10, 11 and 12, the potentiometers respectively serving as a compensation adjuster, output transducer, a zero interlock potentiometer, an input transducer and a zero voltage ratio adjuster. These circuits include a voltage sensing relay having a plurality of windings 16a, 16b and 16c for operating a normally closed contact 16d, and a relay having a single winding 18a and operating contacts 18b, 18c and 18d, and a starting switch 15. The above circuits control the flow of electric power to means of some kind for controlling the flow of material, such as the electric operator 25a of a valve 25 in a conduit 26 by which material is discharge into a container 27. The level of liquid in the container is determined by reaction of a float 28 operating on movable contact 9a of the output transducer 9.

Relay 16a–16d is required to open its contact 16d when the vector sum of the ampturns of winding 16a plus winding 16b and plus winding 16c are in phase (positive) with the supply voltage from line 6 to line 7, and to close such contact when the above vector sum is out of phase (negative) relative to the supply voltage. (To calibrate the control circuit dynamically, the values of current circulating through the windings 16a and 16c are adjustable as will be understood by one skilled in the art.)

Assuming that transducer 9, 9a is set for its minimum practical output value with transducer 11 set at zero, and that relay winding 16b is connected between transducers 9 and 10, the impedance of winding 16b is very high but current flows through such winding which then causes opening of contact 16d. Current flow through winding 16c is then so adjusted that the value of the ampere turns of winding 16c is exactly equal and opposite to the ampere turns of the current flowing in winding 16b. The vector sum of the ampere turns of winding 16b and 16c is less than zero by the setting of the potentiometer and contact 16d remains closed even though the output of transducer 9 is not exactly at zero. If the starting switch 15 is now closed, power is applied to the relay windings 18a and contact 18c is opened while contacts 18b and 18d are closed. Power is then furnished to the electric operator 25a for opening the valve 25.

At this time the winding 16b is connected between the output transducer 9 and the input transducer 11. When the material in container 27 reaches the desired level, the total vector sum of the ampere turns of winding 16a and 16c will cause contact 16d to open. Relay winding 18a and the valve operator 25a are then deenergized to cut off the flow of material. However, there are inherent time relays in any system, e.g. contact 16d can open only after the sum of the vector turns of windings 16a and 16c equals zero and the valve operator 25a begins to move in one direction only after the contact 16d is open. In the present system, all such delays are compensated by winding 16a which is so connected to the compensation adjuster potentiometer 8 as to cause contact 16d to open a controlled time before the level of material in container 27 reaches its desired value.

In cases where the controlling condition or property of the material are highly non-linear functions of time and/or where large changes in the controlling condition or property can occur within the time lags inherent in the system, an "off-on" modulation can be applied to the system just before the point at which the controlling action of the circuit is to take place. A modulating system is shown in FIG. 2 which differs from FIG. 1 in the addition of contacts 16e and 16f to relay 16a–16d of FIG. 1 and an "off" timer relay with a winding 30a and contacts 30b and 30c and an "on" timer relay with winding 31a and contact 31b are added to the circuit.

The system of FIG. 2 is again assumed to have its output potentiometer-transducer 9 set to its minimum practical output when the controlling material condition or property and the input potentiometer-transducer 11 are both at zero. Relay winding 16b is connected between output transducer 9 and zero interlock potentiometer 10 and, even though the impedance of such winding is quite high, sufficient current flows through the winding to cause contacts 16d and 16e to open and contact 16f to close. Current flow through winding 16c is then so adjusted that the total of ampere turns of winding 16c is exactly equal to and opposite to the ampere turns of winding 16b. The vector sum of the ampere turns of winding 16b plus winding 16c is then less than zero by the resistance of potentiometer 10, contacts 16d and 16e are reclosed and contact 16f is reopened, contact 16D and 16e being normally closed and contact 16f being normally open.

Pressure on the starting switch 15 now applies power to the relay winding 18a which closes normally open contacts 18b and 18d while normally closed contacts 18c are opened. Power is also applied to the electric operator 25a for control of flow of the materials. Relay winding 16b is now connected between the output transducer 9 and the input transducer 11, relay winding 16c compensating for changes in output of the transducer 9. Relay winding 16a is energized by current proportional to the amount of modulation desired in the system. Such current provides a vector sum of ampere turns of relay winding 16b plus winding 16a plus winding 16c, which exceeds zero just before the controlling material condition reaches the desired value and contacts 16d, 16e and 16f are shifted to the opposite of the positions shown in the drawings. Thus normally closed contacts 16d and 16e are opened and electric drive 25a is deenergized so that the system is in the "off" condition.

Putting the system in the "off" position as described above also closes contact 16f and causes the "off" relay timer 30a to be energized. Such relay has two sets of contacts which operate in sequence namely 30b, 30c with some time delay between the action of the two contacts. After a predetermined time, normally open contact 30b closes and energizes winding 31a of the "on" relay timer. Normally closed "on" timer contacts 31b open immediately and winding 16a is deenergized. If the controlled material property has not yet reached the desired value, the vector sum of the ampere turns of winding 16b and plus winding 16c will be less than zero and contacts 16d and 16e will close to energize electric operator 25a and contact 16f will open to deenergize timer windings 30a and 31a.

After a predetermined time, normally closed contact 31b will re-close so that the off-on cycle is repeated. Recycling continues until the vector sum of the ampturns turns on winding 16b and 16c exceeds zero with winding 16a deenergized. At this time normally closed contact 30c will open to deenergize relay 18a and contacts 18b, 18c and 18d return to the positions shown in the drawing.

FIG. 3 is a combination of three of the circuits shown in FIG. 2, for controlling a number of conditions in a given sequence by use of a step switch, the step switch having five stable states (as opposed to two stable states of a relay). Parts corresponding to those found in FIG. 2 are designated by the same reference numbers as in FIG. 2. In addition to such similar parts, the step switch is indicated as being of the four deck type with groups of contacts 35a–d, 36a–d, 37a–c and 38a–c, four resistors 39a–d are connected in two parallel groups and supply current by way of rectifiers 40a and 40b, and two resistors are connected to the voltage line 7 by way of capacitors 41a and b. The winding and sets of contacts of a number of relays are designated 42a–c, 43a and b and 44a and b. The numeral 45 designates the electric operating means for the step switch.

The operation of the step switch is brought about by closing the starting switch 15 which energizes relay winding 42a to close contact 42b and energize the step switch operating means 45. Relays 43 and 44 are capacity operated timing relays for pulsing the switch operator 45 and coact with relay 42 in energizing such operator, but such effect could be obtained by other known means for actuating a step switch. When the step switch operator 45 is first energized, contacts 35a, 36a, 37a and 38a are closed. Upon the second energization of the switch operator 45 the above contacts are opened and contacts 35b, 36b, 37b and 38b are closed, and at the third operation energization of the switch operator 45 the "b" contacts are opened and contacts 35c, 36c, 37c and 38c are closed. Another energization of the switch operator 45 opens the "c" contacts and closes contact 35d, and further energization of such operator returns the step switch to the "off" position.

When contact 35a, 36a 37a and 38a are closed, the first condition control operator 25a is energized and continues to be energized until the vector sum of the ampere turns of winding 16a plus winding 16b plus winding 16c exceeds zero. At this time the "off-on" modulation described in connection with FIG. 2, begins and acts as previously described until the controlled condition reaches the pre-set condition. At such time the step switch contacts 35a etc. will open and contacts 35b etc. will close. The second condition control operator 25b now energized, and the above process is repeated. On the third operation of step switch to close contacts 35c etc. the third control operator 25c is energized and acts until a pre-set condition is reached. Further operation of the step switch is impossible until the transducer 9 returns to zero whereupon the switch moves to the "off" position and is in position to start a new cycle.

FIG. 4 illustrates two systems similar to that shown in FIG. 1, which are combined in such manner that the input signal is derived from a combination of switch contacts and transformers so arranged as to lend themselves to operation by use of punch cards or punched tape and selector switches. Three decades of switches are used to represent units, tens, and hundreds of the desired value for one or more materials on the cards representing the desired formula. Each switch decade is associated with a voltage divider such as a transformer having three series of nine equal windings, the second series of nine equal windings being $\frac{1}{10}$ the number of turns of the first set of windings and the third series of nine equal windings being $\frac{1}{100}$ the number of turns of the first series of windings. Each similar portion of the circuit of FIG. 4 includes a three decade switch and a voltage divider and such parts are connected by other transformers.

Referring particularly to FIG. 4, it will be seen that relays 18a–d of the two combined circuits are provided with a number of contacts 18c and 18d which perform exactly the same functions as previously described and which are therefore given the same reference numerals. Each of the two sub-circuits has a transformer having three series of windings 50a, 50b and 50c, each series of windings being equal as to the other windings in that series. But the windings 50b are only $\frac{1}{10}$ the number of turns and windings 50c are only $\frac{1}{100}$ the number of turns of windings 50a. Therefore windings 50c measure units, windings 50b measure tens and windings 50a measure hundreds of a given value for material controlled by the switches 52a–c.

Switch contacts 52b and c are connected by transformer winding 51a and these serve as a source of energy for transformer 51. The several switch decades 52a have connected therewith the transformers windings 51b. A line with a fixed resistor 55a and a variable resistor 55b and a parallel line with a transformer 56a are connected to the transformer winding 51b and to the voltage source 6. Resistors 55b and c are mechanically coupled and actually form a duplex potentiometer. The second transformer 51b is also connected by way of the variable resistors and transformers 56b to the line 6 through contacts 18c and d. A connecting transformer and three decades of switches join the two sets of transformer windings 50a-c and the switches 52a-c through another transformer 53a. The connecting transformer has windings which are not equal in size and which are therefore given separate numerals 53a-l. Such connecting transformer serves as a multiplier or divider for the digits of the units, tens, and hundreds transformers previously described and allows further change in results obtainable from the present system.

FIG. 5 illustrates a punch card which is used to control the operations of selector switches 52a, b, c, etc. of FIG. 4. Columns #1 and #2 of the card have been punched to leave the values 612 in column #1 and 262 in column #2. Thus if material to the amounts of 612 and 262 units respectively are to be mixed, such a mixture is controlled by the punch card. For example, the sixth contact of third switch decade 52c, the first contact of the second switch decade 52b and the second contact of the first switch decade 52a will be closed to achieve 612 units of one material.

When different materials are to be mixed in different quantities as is true when mixing cement, water and aggregate to form concrete for different uses, the card should show the complete formula for the particular concrete. Column 1 is used to control the pounds of cement, column 2 to control the pounds of water, column 3 to control the pounds of sand and the succeeding columns are used to control the weight of different sizes of stone or other aggregate. Each column contains a hundreds, tens and units column and all numerals are punched out excepting those showing a particular amount of the material represented in a particular column, so that each card shows the formula for which it is intended. The card is read by the normally open switches 52a etc., the groups of switches being arranged in the same relationship as the numbers of the card. Thus insertion of a card into a reader closes those switches matching the numbers not punched out of the card.

Assuming that a card has been punched for the following formula:

| | Pounds |
|---|---|
| Cement | 612 |
| Water | 262 |
| Sand | 1090 |
| Stone (small) | 1030 |
| Stone (large) | 1000 |

Only the numerals 612 will show in column 1, only the numerals 262 will show in column 2 and the other columns will show only the numerical expression for the particular material alloted to a given column. Obviously the systems and cards can be set up to meter any desired amounts and are not limited to even four digit amounts.

Sometimes the variable to be controlled in one sub-circuit affects the other sub-circuit and such action needs to be compensated without need for setting up other punch cards. The parts used for compensation are the fixed resistor 55a and the duplex variable resistors 55b and c. Fixed resistor 55a and the variable resistor section 55b are so connected with the voltage input to the affected sub-circuit is increased by the amount of the undesired effect. The primary 56a (of transformer 56a and b) is connected across the voltage input representing the desired value for the first sub-circuit and the secondary 56b of the transformer is connected in the input circuit for the second sub-system so that part of the voltage obtained from the second variable resistor 55c opposes the voltage ratio representing the desired value for material in the second sub-system. Hence, there is automatic compensation for any undesired effect transmitted between the two sub-circuits.

We claim:

1. A digital to analogue voltage ratio convertor comprising; electric lines as a source of voltage; a voltage divider transformer connected to said source and having three sets of nine equal windings each with two sets of windings respectively of $\frac{1}{10}$ and $\frac{1}{100}$ the size of the third set of windings; and a plurality of selectively actuable switches each of which is associated with one of said voltage divider windings and serving for additive action of the windings selected by said switches as units, tens and hundreds of a value of a material to be controlled; transformer means for algebraically adding the voltages in said three sets of windings selected by said switches; and a variable ratio multiplying transformer with plural windings each associated with a switch coupled to said voltage divider transformer for deriving an energizing voltage for said voltage divider transformer capable of multiplying the voltage of such voltage divider, whereby the output analogue voltage from said convertor is equal to the voltage of said source times the ratio of said multiplying transformer multiplied by analogue voltage ratio corresponding to the digital number in accordance with which the switches of said voltage divider transformer are operated.

2. A digital to analogue voltage ratio convertor comprising; electric lines as a source of voltage; an additive transformer comprising a primary winding and a secondary winding; a voltage dividing transformer connected to said source and having three sets of nine equal windings, one set having $\frac{1}{10}$ the number of turns of a second set multiplied by the turns-ratio of said primary winding divided by said secondary winding, a third set having $\frac{1}{100}$ the number of turns of said second set multiplied by the turns-ratio of said primary winding divided by said secondary winding; and three decades of switches, each decade connected with its respective set of windings, the decades of switches connected with said one set and third set of windings serving when selected by being closed as a source of energy for said primary winding, said energy being an analogue voltage ratio of the selected tens and units, the said decade of switches which is connected with said second set of windings when selected by being closed producing an analogue voltage ratio corresponding to the selected hundreds, said second decade of switches being connected in series with said secondary winding to produce an analogue voltage ratio corresponding to the digital information furnished by the switches that are closed, and variable ratio multiplying transformer means connected to said electric lines and coupled to said voltage dividing transformer for deriving an energizing voltage for said voltage dividing transformer which is a selected ratio of the voltage of said source, whereby the output analogue voltage from said convertor is equal to the voltage of said source times the ratio of said multiplying transformer multiplied by said analogue voltage ratio corresponding to the digital information furnished by the switches that are closed.

3. The combination of electrical lines as a source of voltage, a pair of digital to analogue voltage ratio convertors; said convertors each comprising, an additive transformer comprising a primary winding and a secondary winding, a voltage dividing transformer having three sets of nine equal windings, one set having $\frac{1}{10}$ the number of turns of a second set multiplied by the turns-ratio of said primary winding divided by said secondary winding; a third set having $\frac{1}{100}$ the number of turns of said second set multiplied by the turns-ratio of said primary winding divided by said secondary winding, and three decades of switches, each decade connected with its respective set of windings, the decades of switches connected with said one set and third set of windings serving when selected by being closed as a source of energy for said primary winding, said energy being an analogue voltage ratio of the selected tens and units, the said decade of switches which is connected with said second set of windings when selected by being closed producing an analogue voltage ratio corresponding to the selected hundreds, said second decade of switches being connected in series with said secondary winding to produce an analogue voltage ratio corresponding to the digital information furnished by the switches that are closed, whereby said pair of convertors derive a pair of analogue voltage ratios; and means including a compensating transformer and a voltage divider for transferring energy from the output of one of said convertors to the output of the second of said convertors so that a selected portion of the output of the compensating transformer will selectively add to or subtract from the output of the second convertor.

4. The combination of an electrical multiplier for furnishing a source of energy to a pair of digital to analogue voltage ratio convertors; said multiplier comprising; electrical lines as a source of voltage; a voltage dividing transformer having a number of windings each of which are proportional in number of turns to the magnitude of the desired multiplicand; a number of switches, one switch of which is closed for each desired multiplicand, said transformer being connected to said source and connected through said closed switch to said convertors to thereby furnish a source of energy to said convertors; said convertors each comprising, an additive transformer comprising a primary winding and a secondary winding, a voltage dividing transformer having three sets of nine equal windings, one set having $\frac{1}{10}$ the number of turns of a second set multiplied by the turns-ratio of said primary winding divided by said secondary winding, a third set having $\frac{1}{100}$ the number of turns of said second set multiplied by the turns-ratio of said primary winding divided by said secondary winding; and three decades of switches, each decade connected with its respective set of windings, the decades of switches connected with said one set and third set of windings serving when selected by being closed as a source of energy for said primary winding, said energy being an analogue voltage ratio of the selected tens and units multiplied by the selected multiplicand, the said decade of switches which is connected with said second set of windings when selected by being closed producing an analogue voltage ratio corresponding to the selected hundreds multiplied by the selected multiplicand, said second decade of switches being connected in series with said secondary winding to derive an analogue voltage ratio in each convertor corresponding to the digital information furnished by the switches that are closed.

5. The combination set forth in claim 4 and having means including a compensating transformer and a voltage dividing network for transferring energy from the output of one of said convertors to the output of the second convertor so that a selected portion of the output of the compensating transformer will selectively add to or subtract from the output of the second convertor.

6. Means for automatically controlling a mechanical value of a material comprising, in combination, electric operating means for controlling the material, a source of voltage, an output potentiometer energized from said voltage source, means for controlling the position of the movable contact of said output potentiometer as a function of said mechanical value, means having a plurality of windings for controlling said electrical operating means and being adapted to operate when the vector sum of the ampere turns of said windings is equal to a predetermined magnitude, input voltage dividing means connected to said voltage source and adapted to be set in accordance with a desired magnitude of said mechanical value, the first of said windings being connected between said input voltage dividing means and the movable contact of said output potentiometer, and means for calibrating said output potentiometer to a minimum voltage ratio as the zero of said mechanical value, said calibrating means including the second of said windings and a potentiometer connected to said source of voltage for adjustably energizing said second winding.

7. In electrically actuated apparatus for controlling the magnitude of a variable physical quantity, the combination of a source of voltage, means for controlling said physical quantity, output means connected to said source of voltage for deriving a first voltage ratio proportional to the magnitude of the variable physical quantity, said output means having a minimum voltage ratio greater than zero, adjustable input means connected to said source of voltage for deriving a second voltage ratio proportional to a selected magnitude of said variable physical quantity, means having a plurality of windings one of which is connected between said input and output means for comparing said first and second voltage ratios and being adapted to operate and actuate said means for controlling said physical quantity when the vector sum of the ampere turns of said windings is equal to a predetermined magnitude, and means energized from said source of voltage and coupled to a second of said windings for calibrating said comparing means to zero when said input means is adjusted to zero and said output means is of said minimum voltage ratio.

8. In electrically actuated apparatus for controlling the magnitude of a variable physical quantity, the combination of output means for deriving a first voltage ratio proportional to the magnitude of said physical quantity, said voltage ratio deriving output means having a minimum voltage ratio greater than zero, adjustable input means for deriving a second voltage ratio proportional to a selected magnitude of said physical quantity, means for comparing said first and second voltage ratios, said comparing means being connected to said input and to said output means and being capable of being energized from a plurality of inputs, means actuated by said comparing means for controlling said physical quantity, and means for calibrating said comparing means to zero at said minimum voltage ratio of said output means and comprising a second input to said comparing means.

9. Means for automatically controlling a mechanical value of a material comprising, in combination, an electric operator for controlling the material, an output potentiometer, means for controlling the position of the movable contact of said output potentiometer as a function of said mechanical value, means for controlling said electric operator and having a plurality of windings and being adapted to operate and actuate said electric operator when the vector sum of the ampere turns of said windings is equal to a predetermined magnitude, input voltage dividing means adapted to be set in accordance with a desired magnitude of said mechanical value, one of said windings being connected between said input voltage dividing means and the movable contact of said output potentiometer, means including a second of said windings for calibrating said output potentiometer to a minimum voltage ratio as the zero of said mechanical value, and means including a third of said windings for actuating said electric operator slightly before said mechanical value of said material reaches said desired magnitude.

10. In electrically actuated apparatus for controlling the magnitude of a plurality of variable physical quantities, the combination of a source of voltage, each of said physical quantities having associated therewith means connected to said voltage source for deriving an output voltage proportional to the magnitude of said variable physical quantity, means for controlling the magnitude of said physical quantity, voltage dividing means having three decades of decimally related switches selectively actuable in accordance with a three digit number XYZ for providing an output analogue voltage which is 0.XYZ times the input voltage, and means for comparing said derived output voltage and said analogue voltage and being actuable in response to a predetermined ratio of said voltages to actuate said magnitude controlling means; and variable ratio multiplying transformer means connected to said voltage source and coupled to all of said voltage dividing means for deriving a selectively variable energizing voltage for said voltage dividing means associated with all of said physical quantities, whereby the analogue voltage seen by each said comparing means is 0.XYZ times the voltage of said source multiplied by the ratio of said multiplying transformer.

11. In electrically actuated apparatus for controlling the physical quantity of a plurality of materials, the combination of a source of voltage, each of said materials having associated therewith means connected to said voltage source for deriving an output voltage proportional to the quantity of said material, means for controlling the quantity of said material, input voltage dividing transformer means having three decades of decimally related switches selectively operable in accordance with a three digit number XYZ for providing an output analogue voltage which is 0.XYZ times the input voltage, a reader responsive to holes punched in a card having columns of decimally related numbers for actuating said switches in accordance with the three digit number XYZ punched in said card, means for comparing said derived output voltage and said analogue voltage and being operable in response to a predetermined ratio of said voltages for actuating said quantity controlling means; and variable ratio multiplying transformer means connected to said source of voltage and having a plurality of taps and switches connected to said taps for deriving a voltage which is a selected ratio of the voltage of said source, said multiplying transformer means being coupled to said input voltage dividing transformer means associated with all of said materials, whereby the analogue voltage seen by each of said comparing means is 0.XYZ times the voltage of said source multiplied by the ratio of said multiplying transformer.

12. In electrically actuated apparatus for controlling the magnitude of a variable physical quantity, the combination of a source of voltage, an ouput potentiometer energized from said source of voltage for deriving a first voltage proportional to the magnitude of the variable physical quantity, multiplying transformer means connected to said voltage source and divided by taps into a plurality of groups of turns and a plurality of switches each of which is connected to one of said taps for deriving an output potential which is a selectively adjustable ratio of the voltage of said source, voltage dividing means including a plurality of decade transformers having their turns algebraically added together and each being divided by taps into a plurality of groups of turns and a plurality of decades of switches each switch of which is associated with one of said groups of turns and connected to one of said taps for deriving a voltage which is a selectively adjustable ratio of said output potential corresponding to the individual switches which are operated in each decade of switches, the number of turns per group in successive decade transformers being related decimally, said voltage dividing means including transformer means for algebraically adding the groups of turns in said decade transformers selected by operation of said switches, reader means actuable by a card punched in accordance with a multi-digit number for simultaneously operating one switch in each decade of switches corresponding to a digit of said number, whereby said voltage derived by said voltage dividing means is an analogue of the voltage of said source times the multi-digit number punched in said card multiplied by the ratio of said multiplying transformer, means for comparing said first voltage and said voltage derived by said voltage dividing means, and means operated by said comparing means for controlling said variable quantity.

13. In electrically actuated apparatus for controlling the magnitude of a variable physical quantity, the combination of a source of voltage, variable ratio multiplying transformer means connected across said source of voltage for deriving an output potential which is a selectively adjustable ratio of the voltage of said source, said multiplying transformer means being divided by taps into a plurality of groups of turns and including a plurality of switches each of which is connected to one of said taps, and voltage dividing transformer means coupled to the output of said multiplying transformer means and including a plurality of decade transformers for deriving a voltage which is a selectively adjustable ratio of said output potential, each decade transformer being divided by taps into a plurality of equal groups of turns and said voltage dividing means including a plurality of decades of switches each of which is associated with one of said groups of turns and connected to one of said taps and the number of turns per group in successive decade transformers being decimally related and said ratio being adjustable by selective operation of individual switches of said decades of switches corresponding to the digits of a multi-digit number, and means for algebraically adding the groups of turns in said decade transformers selected by operation of said switches, whereby the voltage derived by said voltage dividing means is an analogue of the voltage of said source times the ratio of said multiplying transformer multiplied by the ratio of said voltage dividing transformer means corresponding to said multi-digit number.

14. In electrically actuated apparatus for controlling the magnitude of a variable physical quantity, the combination of a source of voltage, variable ratio multiplying transformer means connected to said source of voltage for deriving an output potential which is a selectively adjustable ratio of the voltage of said source, and voltage dividing transformer means coupled to said multiplying transformer means and including a plurality of decade transformers for deriving a voltage which is a selectively adjustable ratio of said output voltage, each decade transformer being divided by taps into a plurality of equal groups of turns and said voltage dividing transformer means including a plurality of decades of switches each of which is associated with one of said groups of turns and connected to one of said taps and the number of turns per group in successive decade transformers being decimally related, whereby the voltage derived by said voltage dividing transformer means is an analogue of the voltage of said source times the ratio of said multiplying transformer means multiplied by the ratio of said voltage dividing transformer means selected by operation of said switches.

15. In electrically actuated apparatus for controlling the magnitude of a mechanical value of a plurality of materials, the combination of a source of voltage, a variable ratio multiplying transformer connected to said source of voltage for deriving a first voltage which is a selectively adjustable ratio of the voltage of said source, each of said materials having associated therewith output potentiometer means connected to said source of voltage for deriving an output voltage proportional to the magnitude of the mechanical value of said material, voltage dividing transformer means coupled to said multiplying transformer for deriving a selectively adjustable analogue voltage which is 0.XYZ times said first voltage, where XYZ is a three digit number, said voltage dividing means including a plurality of decade transformers having their outputs algebraically added together and each being divided by taps into a plurality of equal groups of turns and also including a plurality of decades of switches with each switch being associated with one of said groups of turns and connected to one of said taps and the number of turns per group in successive decade transformers being decimally related, means for comparing said output voltage 16. In an electric circuit for automatically controlling a mechanical value associated with a material, an electric operator for controlling the material, electric lines as a source of voltage, a potentiometer-transducer operating from the voltage source and converting said mechanical value into an electric signal by change in voltage ratio upon change in position of the movable potentiometer contact, means capable of being energized from a plurality of inputs for controlling said electric operator, one of said inputs being said electric signal derived by said transducer, and means energized from said source of voltage and coupled to said means for controlling said electric operator for calibrating said transducer to a minimum voltage ratio as the zero of said mechanical value, said calibrating means comprising a second input to said means for controlling said electric operator.

17. In an electric circuit for automatically controlling a mechanical value associated with a material, an electric operator for controlling the material, electric lines as a source of voltage, a potentiometer-transducer operating from the voltage source and converting said mechanical value into an electric signal by change in voltage ratio upon change in position of the movable potentiometer contact, means energized from said source of voltage for calibrating the transducer to a minimum voltage ratio as the zero of said mechanical value, means having a plurality of windings, one of which is connected to said transducer and energized by said electric signal for controlling said electric operator, said calibrating means including a second winding of said means for controlling said electric operator, and said means for controlling said electric operator being adapted to operate when the vector sum of the ampere turns of said windings is equal to a predetermined magnitude.

18. In an electric circuit for controlling a number of materials responsive to a mechanical value thereof, electric lines as a source of voltage, plural sub-circuits each including an electric operator for acting on the material, a potentiometer-transducer operated from the electric lines and converting said mechanical value into an electric signal upon change in voltage ratio responsive to change in position of the potentiometer movable contact, means for calibrating the transducer to a minimum voltage ratio as the zero of the mechanical value to be converted into an electric signal by the transducer, means capable of being energized from a plurality of inputs and being coupled to said transducer and to said calibrating means for controlling said electric operator upon change in said voltage ratio, a voltage divider transformer having three sets of nine equal windings each with two sets of windings respectively of $\frac{1}{10}$ and $\frac{1}{100}$ the size of the third set of windings, and a plurality of selectively actuable switches each of which is associated with one of said voltage divider transformer windings and serving for additive action of the windings selected by said switches as units, tens, and hundreds of a value of the material to be controlled, said means for controlling said electric operator being coupled to said voltage divider transformer and comparing said electric signal from said transducer with the electric signal derived by said voltage divider, and a multiplying transformer connected to said electric lines and coupled to said voltage divider transformers of all of said sub-circuits and provided with plural windings each associated with a switch for deriving an energizing voltage for said voltage divider transformers of all of said sub-circuits, said switches associated with said multiplying transformer windings being selectively actuable to change the magnitude of said energizing voltage derived by said multiplying transformer.

19. In an electric circuit for controlling a number of materials responsive to a mechanical value thereof, electric lines as a source of voltage, plural sub-circuits each including an electric operator for acting on the material, a potentiometer-transducer operated from the electric lines and converting said mechanical value into an electric signal upon change in voltage ratio responsive to change in position of the potentiometer movable contact, means for calibrating the transducer to a minimum voltage ratio as the zero of the mechanical value to be converted into an electric signal by the transducer, means capable of being energized from a plurality of inputs and being coupled to said transducer and to said calibrating means for controlling said electric operator upon change in said voltage ratio, a voltage divider transformer having three sets of nine equal windings each with two sets of windings respectively of $\frac{1}{10}$ and $\frac{1}{100}$ the size of the third set of windings, and a plurality of selectively actuable switches each of which is associated with one of said voltage divider transformer windings and serving for additive action of the windings selected by said switches as units, tens, and hundreds of said mechanical value, and means for algebraically adding the voltages of the windings of said sets selected by said switches, said algebraic adding means being coupled to said means for controlling said electric operator; a multiplying transformer connected to said electric lines and being provided with plural windings each associated with a switch for deriving a voltage for energizing said voltage divider transformers of all of said sub-circuits, said switches associated with said multiplying transformer being selectively actuable to change the voltage derived by said multiplying transformer, the output of said multiplying transformer being coupled to said voltage divider transformers of all of said sub-circuits, and adjustable compensating transformer means for transferring a portion of the output signal from the voltage divider transformer of one of said sub-circuits to the output of the voltage divider transformer of a second of said sub-circuits.

20. Apparatus for mixing cement, water, and aggregate materials to produce concrete, each of said materials having associated therewith electrically operated means for controlling said material, potentiometer means for deriving an output electric signal proportional to quantity of said material, voltage dividing transformer means having a plurality of decades of decimally related windings and switches connected to said windings selectively actuable in accordance with a multi-digit desired quantity XYZ of said material for deriving an analogue voltage signal which is 0.XYZ the input voltage thereto, and means for comparing said output signal and said analogue voltage signal and being actuable in response to a predetermined ratio of said signals to actuate said means for controlling said material, and batch size selector transformer means coupled to said voltage dividing transformer means of all of said materials for deriving an energizing voltage therefor and being selectively adjustable to generate a voltage proportional to the size of concrete batch desired, whereby the output voltage from each voltage divider transformer is an analogue of batch size multiplied by desired quantity XYZ of the corresponding material.

21. Apparatus in accordance with claim 20 wherein said comparing means includes a plurality of windings, one of which is connected between said potentiometer means and said voltage dividing transformer means and said comparing means is adapted to operate when the vector sum of the ampere turns of said windings exceeds a predetermined magnitude and including means connected to another of said windings for actuating said means for controlling said material slightly before said quantity of said material reaches the selected quantity XYZ multiplied by the batch size to which said multiplying transformer is adjusted.

22. Apparatus for mixing cement, water, and aggregate materials to produce concrete, comprising, in combination, a source of voltage, each of said materials having associated therewith electrically operated means for controlling said material, means connected to said source of voltage for deriving an output signal proportional to the quantity of said material, voltage dividing means selectively actuable in accordance with a multi-digit desired quantity of said material for deriving a signal which is an analogue of the voltage input thereto multiplied by said multi-digit desired quantity, means for comparing said output signal and said analogue voltage signal and being actuable in response to a predetermined ratio of said signals to actuate said means for controlling said material, and batch size selector transformer means coupled to said voltage dividing means of all of said materials for deriving an energizing input voltage therefor and being selectively adjustable to generate a voltage proportional to the size of concrete batch desired, whereby the output voltage from each voltage divider means is an analogue of the voltage of said source times batch size multiplied by the desired quantity of the corresponding material.

23. Means for automatically controlling a mechanical value of a material comprising, in combination, electric operating means for controlling the material, a source of voltage, an output potentiometer energized from said voltage source, means for controlling the position of the movable contact of said output potentiometer as a function of said mechanical value, means having a plurality of windings for controlling said electrical operating means and being adapted to operate when the vector sum of the ampere turns of said windings is equal to a predetermined magnitude, input voltage dividing means connected to said voltage source and adapted to be set in accordance with a desired magnitude of said mechanical value, the first of said windings being connected between said input voltage dividing means and the movable contact of said output potentiometer, and means connected to a second of said windings for actuating said means for controlling said material slightly before said mechanical value of said material reaches said desired magnitude.

References Cited in the file of this patent

UNITED STATES PATENTS

| | | |
|---|---|---|
| 2,173,331 | Haines | Sept. 19, 1939 |
| 2,393,748 | Burns | Jan. 29, 1946 |
| 2,402,522 | Bucknam | June 18, 1946 |
| 2,549,307 | Griffes et al. | Apr. 17, 1951 |
| 2,728,041 | Boundy et al. | Dec. 20, 1955 |
| 2,823,036 | Cutler et al. | Apr. 22, 1958 |
| 2,858,430 | Cuba et al. | Oct. 28, 1958 |
| 2,884,587 | Hanthorn et al. | Apr. 28, 1959 |
| 2,886,780 | Schauffler | May 12, 1959 |
| 2,899,621 | Bauer | Aug. 11, 1959 |
| 2,934,751 | MacGeorge | Apr. 26, 1960 |
| 2,927,784 | Lyons | Mar. 8, 1960 |
| 2,954,202 | Bale | Sept. 27, 1960 |
| 3,013,195 | Langham | Dec. 12, 1961 |
| 3,035,214 | Kelling | May 15, 1962 |
| 3,035,648 | Williams | May 22, 1962 |
| 3,040,221 | Fitzner | June 19, 1962 |
| 3,064,182 | Chilton | Nov. 13, 1962 |
| 3,085,191 | Sleeper | Apr. 9, 1963 |